(No Model.) 9 Sheets—Sheet 1.
H. FLAD.
STREET CABLE RAILWAY.
No. 405,468. Patented June 18, 1889.
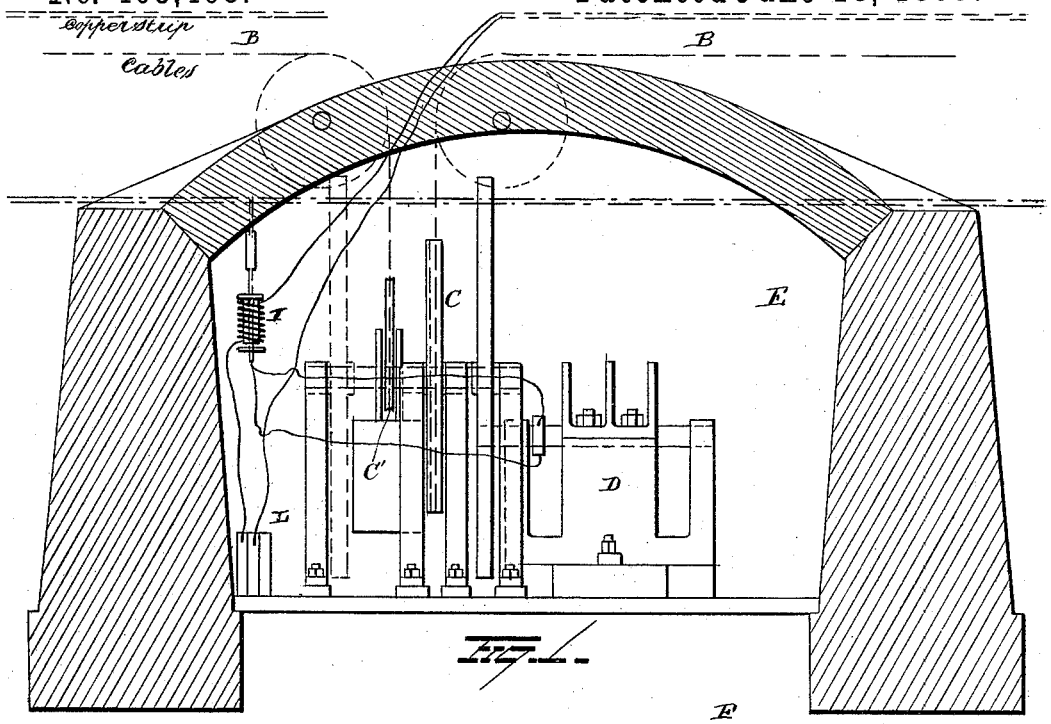
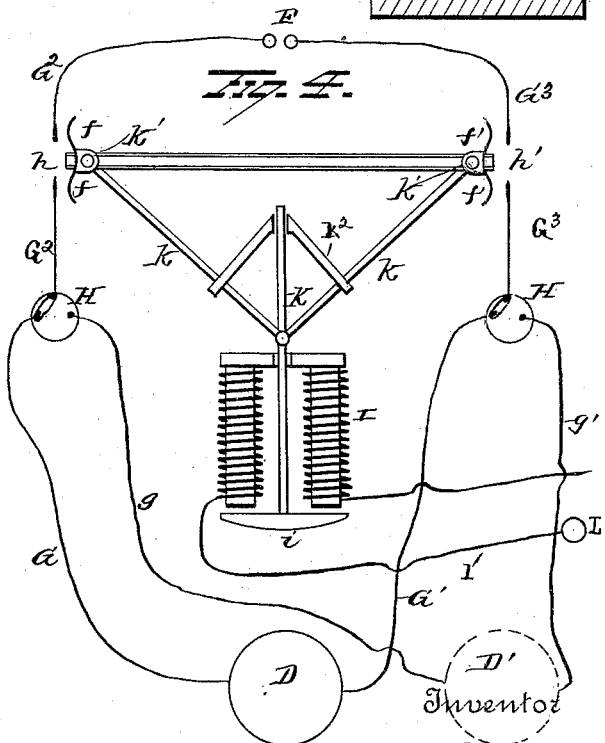
Witnesses
R. Nottingham
G. F. Downing
Inventor
Henry Flad.
By his Attorney
H. A. Sngman.

(No Model.) 9 Sheets—Sheet 2.
H. FLAD.
STREET CABLE RAILWAY.
No. 405,468. Patented June 18, 1889.
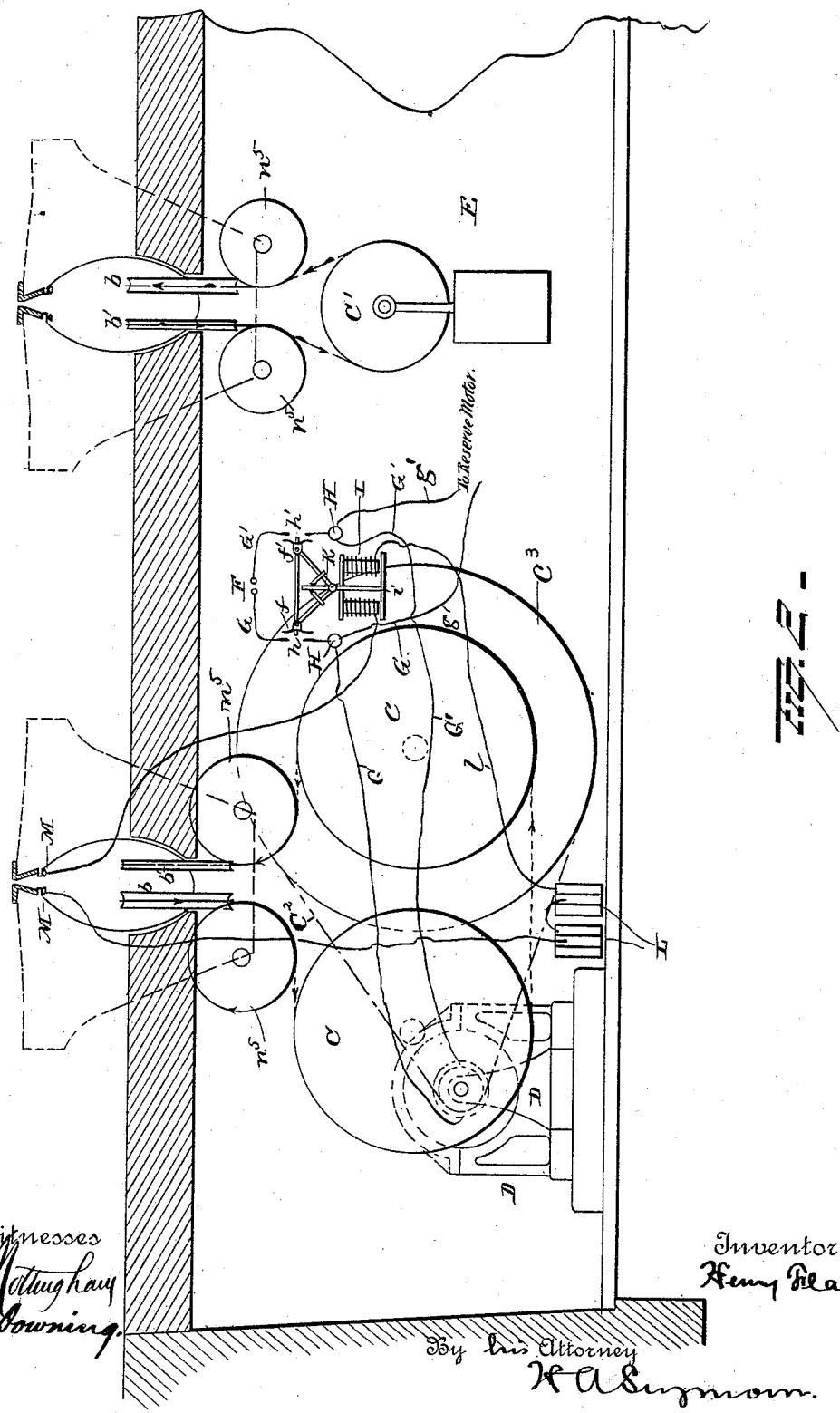
Witnesses
P. Nottingham
G. F. Downing.
Inventor
Henry Flad.
By his Attorney
H. A. Suzman.

(No Model.) 9 Sheets—Sheet 3.
H. FLAD.
STREET CABLE RAILWAY.

No. 405,468. Patented June 18, 1889.

Witnesses
Inventor
Henry Flad.
By his Attorney

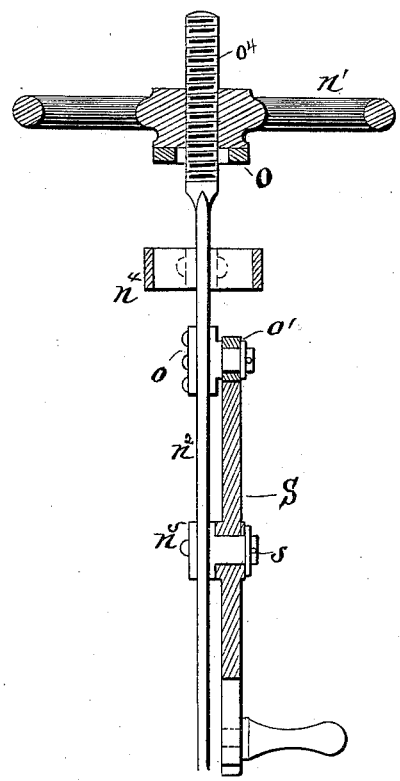

(No Model.) 9 Sheets—Sheet 5.
H. FLAD.
STREET CABLE RAILWAY.
No. 405,468. Patented June 18, 1889.
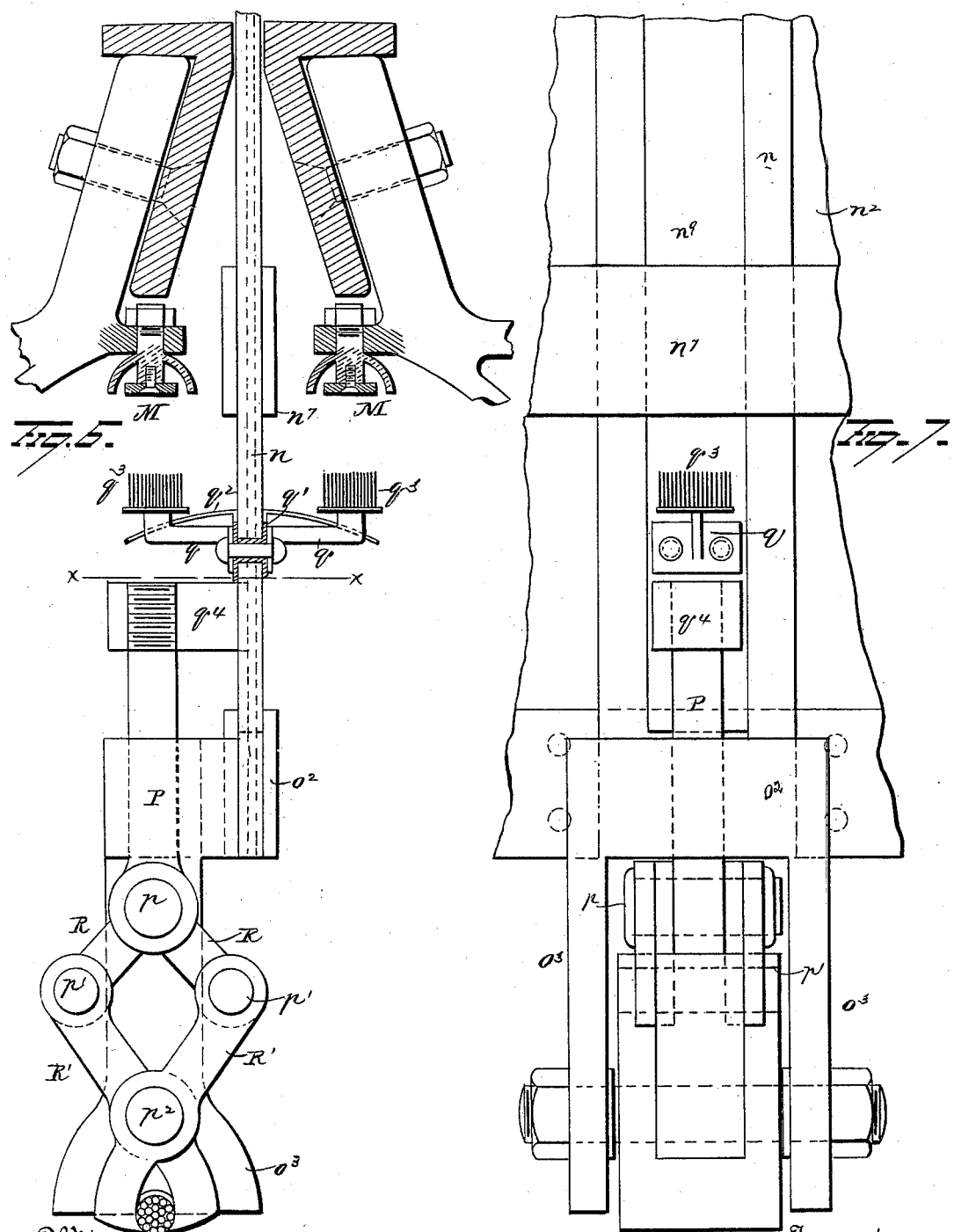

(No Model.) 9 Sheets—Sheet 6.

H. FLAD.
STREET CABLE RAILWAY.

No. 405,468. Patented June 18, 1889.

Witnesses
A. Nottingham
G. F. Downing

Inventor
Henry Flad.
By his Attorney
H. A. Seymour

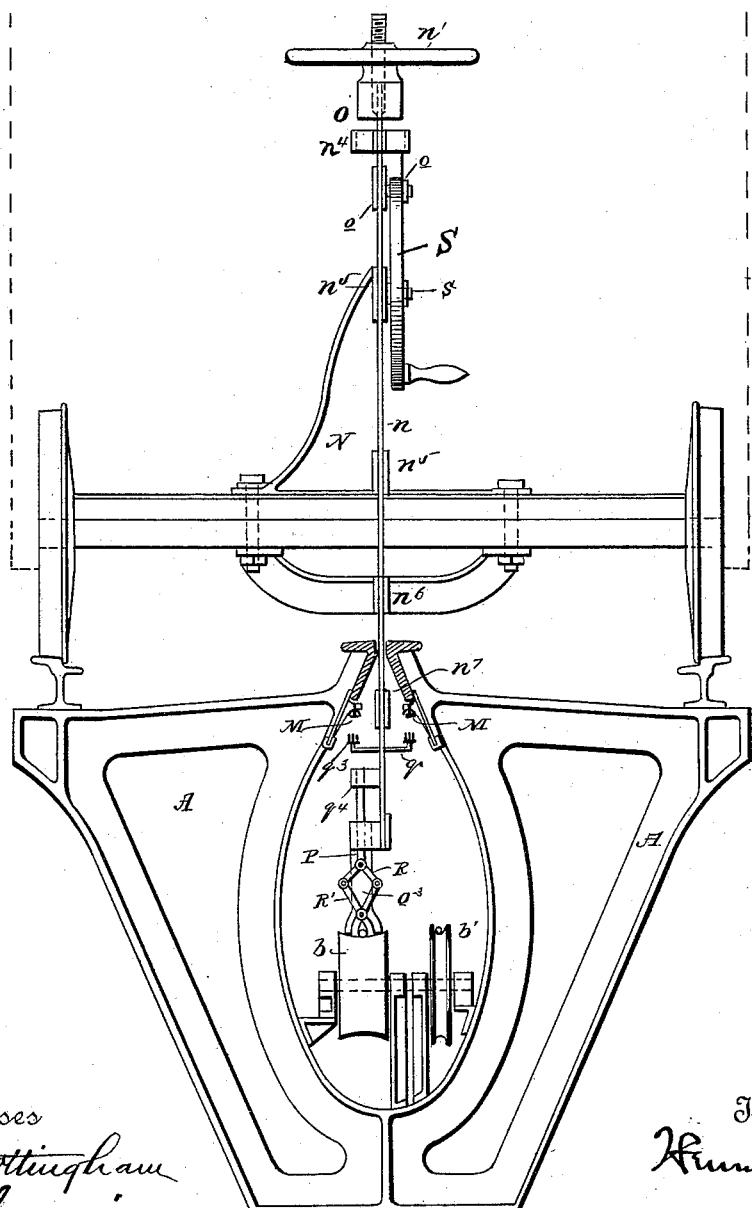

(No Model.) 9 Sheets—Sheet 8.
H. FLAD.
STREET CABLE RAILWAY.
No. 405,468. Patented June 18, 1889.
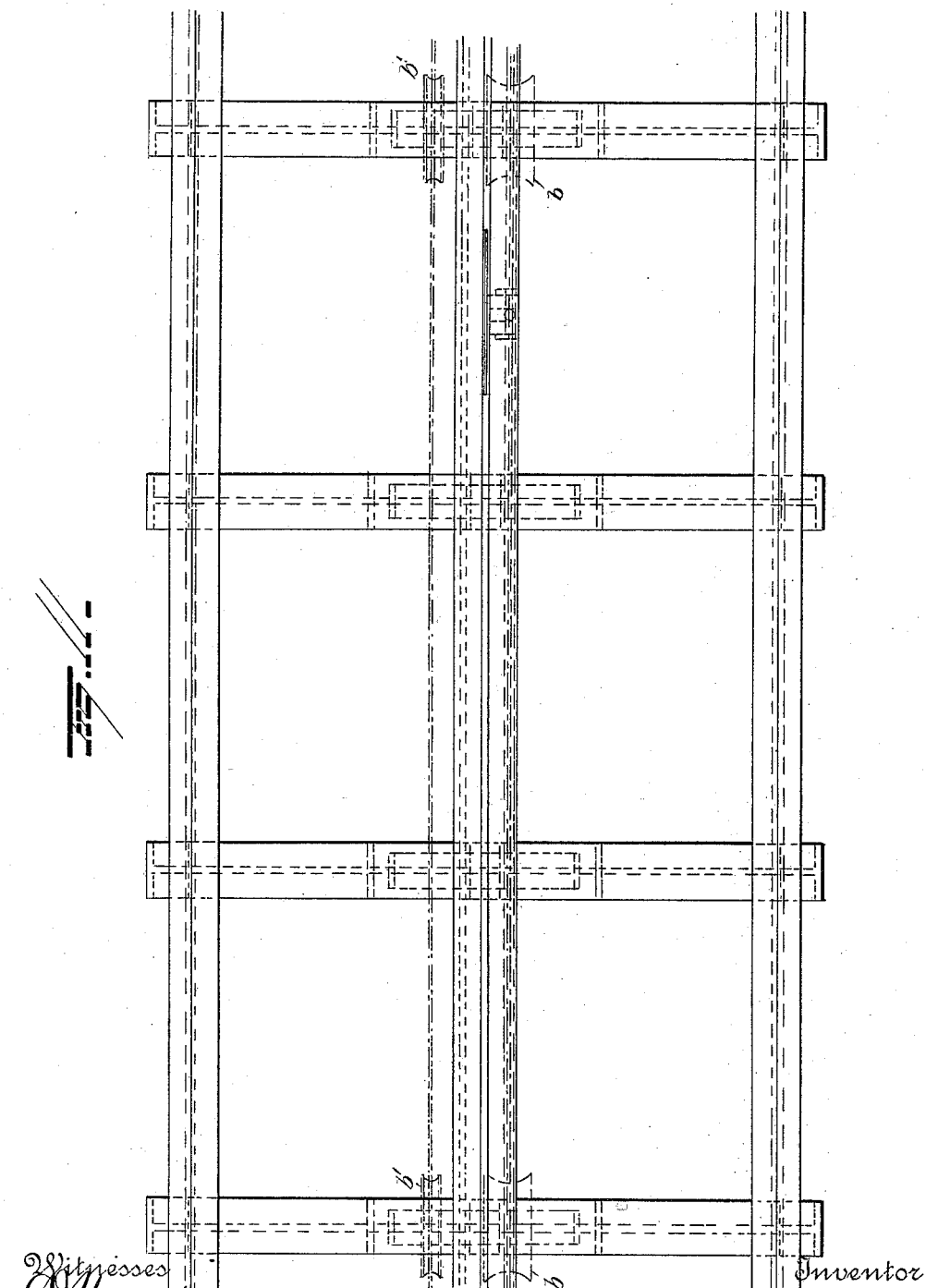

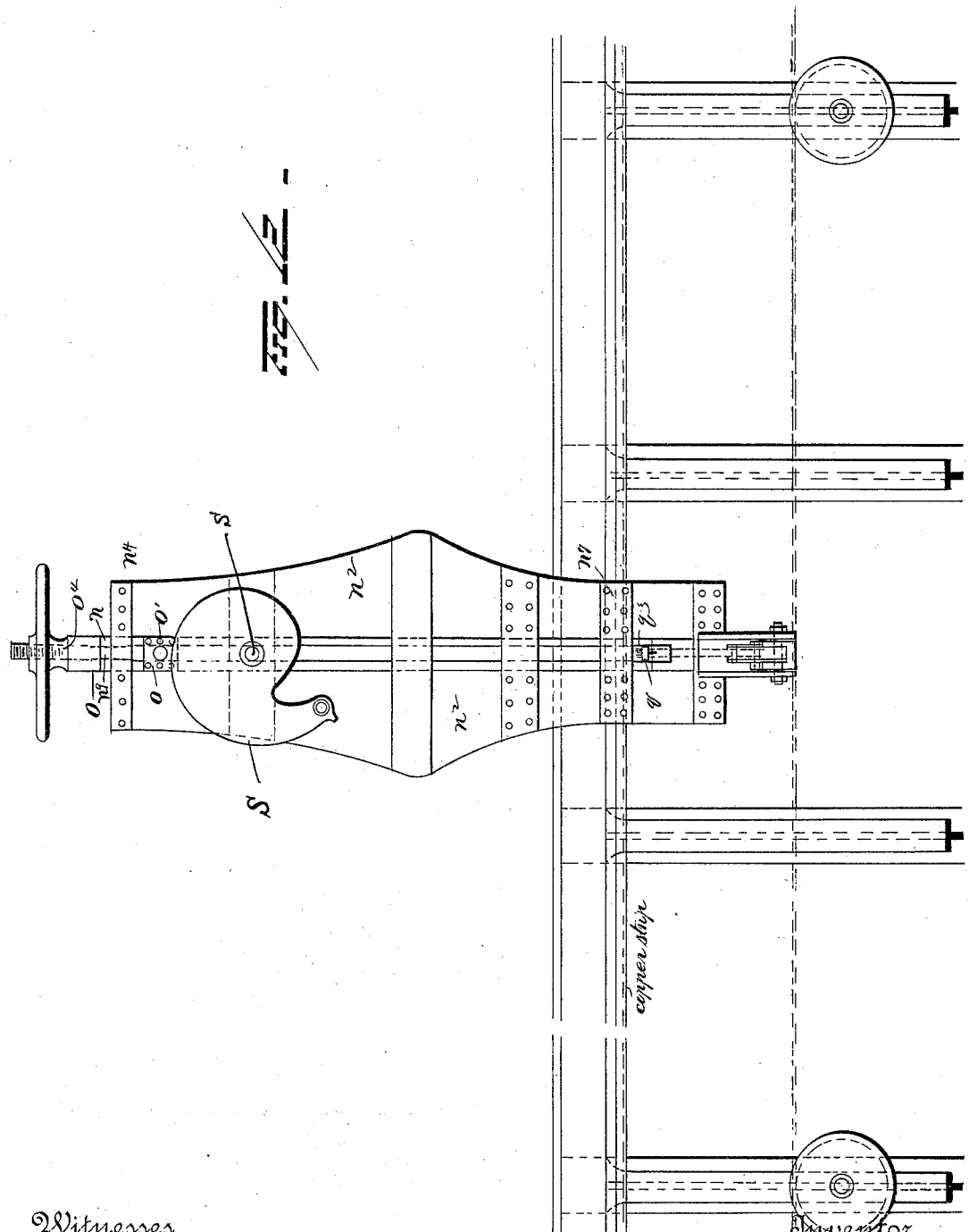

UNITED STATES PATENT OFFICE.

HENRY FLAD, OF ST. LOUIS, MISSOURI.

STREET CABLE RAILWAY.

SPECIFICATION forming part of Letters Patent No. 405,468, dated June 18, 1889.

Application filed September 2, 1887. Serial No. 248,618. (No model.)

*To all whom it may concern:*

Be it known that I, HENRY FLAD, of St. Louis, in the State of Missouri, have invented certain new and useful Improvements in Street Cable Railroads; and I do hereby declare the following to be a full, clear, and exact description of the invention, such as will enable others skilled in the art to which it appertains to make and use the same.
My invention relates to an improvement in street cable railroads.

In an application for Letters Patent entitled "system of rapid transit," filed June 10, 1887, Serial No. 241,518, a cable railroad was shown and described in which several independent cables, each driven by its own independent motor, were arranged one after another along the line of travel and a common power-supply conduit was arranged to actuate the several motors at the will of the train-manager.

The object of my present invention is to provide means for controlling the movements of the cables by electricity.
With this end in view my invention consists in the combination, with a track and a car carrying a grip, of a motor for actuating a cable, a permanently-charged electric conductor located along the line of railway, and means for admitting power to the motor controlled by an electric circuit, which may be established or broken at pleasure.

My invention further consists in a grip, which, in conjunction with a cable-motor, a permanently-charged electric conductor, and an auxiliary conductor, will in gripping the cable effect admission of power to the cable-motor, and in its releasing of the cable will effect the shutting off of the power from the said motor.

Figure 3:
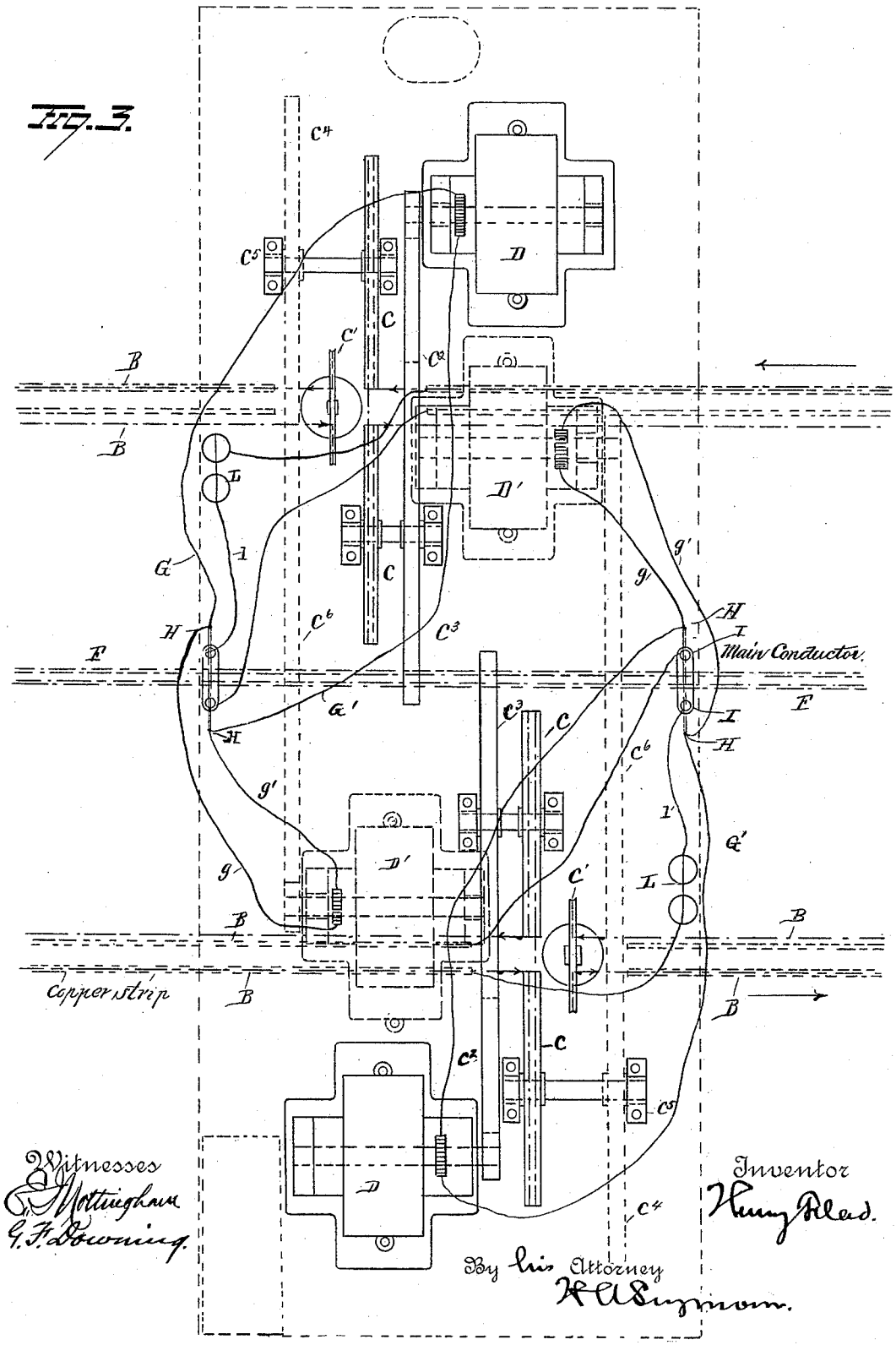
Figure 8:
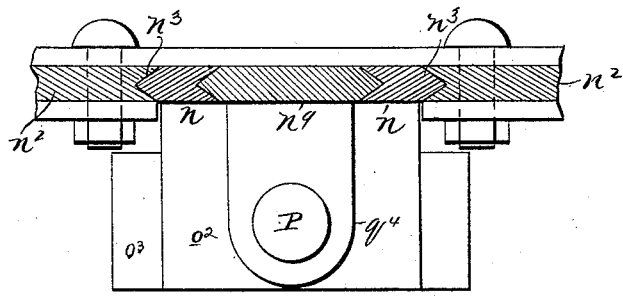
Figure 9:
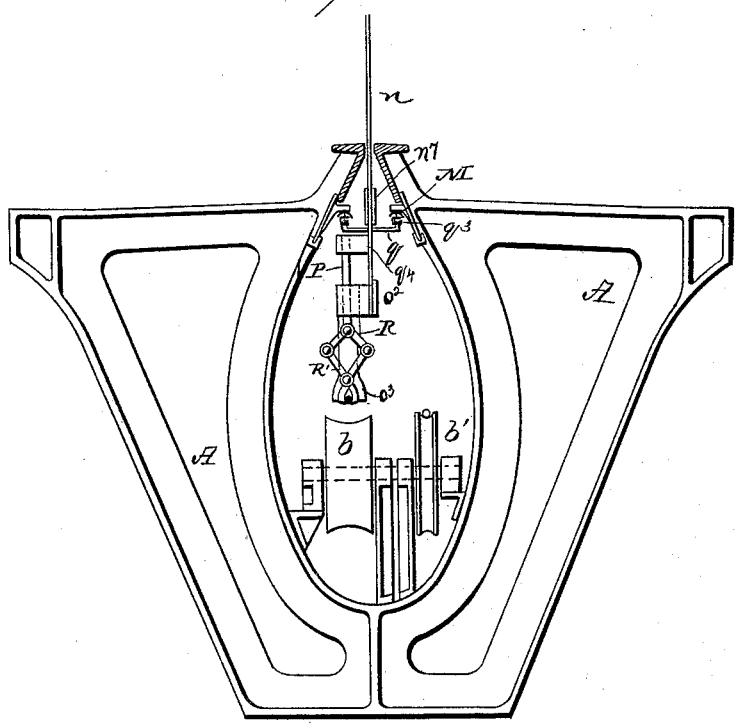

My invention further consists in certain features of construction and combinations of parts, as will be hereinafter described, and pointed out in the claims.
In the accompanying drawings, Figure 1 is a vertical longitudinal section of a portion of the railway, taken through the vault at the terminus of one cable-section and beginning of the succeeding cable-section. Fig. 2 is a vertical section taken transversely to the railway through the said vault. Fig. 3 represents plan views of two successive vaults and portions of the intermediate conductors and cables, the tops of the vaults being removed to show the arrangements of the cable-motors and the mechanism employed in connection therewith. Fig. 4 is a detached view of mechanism for admitting to or cutting power off from the motors. Fig. 5 is a view of a portion of the grip-operating mechanism, partly in section. Fig. 6 is a view in edge elevation of the grip and its accompanying mechanism, showing also the auxiliary conductors and a portion of the cable-conduit in transverse section. Fig. 7 is a view of the grip and its accompanying mechanism in side elevation. Fig. 8 is a cross-section of the grip, taken through line $x$ $x$ of Fig. 6. Figs. 9 and 10 represent cross-sections of the cable-conduit, showing the grip respectively clutched to the cable, as when the car is in motion, and in position to be clutched to the cable. Fig. 11 is a plan view of a portion of a single track; and Fig. 12 is a longitudinal section taken centrally along a single track, showing the relative position and the construction of the portion of the grip above the track.

A represents the cable-conduit, which may be of any well-known or approved construction.

B represents one of the cable-sections, and consists of an endless cable extending between two successive stations. It is expedient that the stations be located at equal distances apart, or that they be an integral number of times the shortest distance apart in order that the trains may be run from station to station in equal times or in multiple of such times. The part of the cable which is calculated to be clutched by the grip is supported within the conduit upon wide-faced pulleys $b$, the faces of the pulleys being but slightly concave, while the idle part of the cable runs on grooved-faced narrow pulleys $b'$. At the terminus of one of the sections the cable is directed downwardly by suitable guide-pulleys $n^5$, and is looped around one or more driving-drums C in the direction indicated by arrows in Fig. 2, and at the beginning of the section the said cable is directed downwardly around a tension-pulley $C'$, said drum C being driven by a belt $C^2$, which passes from the motor over the belt-wheel $C^3$.

Each cable-section is driven by an independent motor D, suitably connected with the driving drum or drums. To accommodate the motor, the driving-drum, the mechanism for controlling the motor, and such other auxiliary devices as it may be found desirable to group together at the terminus of one section and the beginning of the next section, vaults E (see Fig. 3) are provided, which extend across the railroad beneath the cable-conduit, and are made accessible to workmen. The vaults, as herein referred to, are, as may be readily understood, applicable to surface-roads or what are commonly known as "traction underground." A companion motor D', the latter to be employed in case of breakage or stoppage of the motor D for any purpose, is also located within the vault E and capable of being brought into use at a moment's warning.

It will be seen upon reference to Fig. 3 that the band-wheels $C^3$ are positively driven by the motors D by means of belts $C^2$, and it is necessary that some provision be made to connect the motors D' with said band-wheels, so that when the main motors D become inoperative and the motors D' are switched into circuit, motion may be transmitted from motors D' to the band-wheel. For the accomplishment of this purpose the shafts of the drums C are extended and provided with band-wheels $C^4$, Fig. 3, said shafts being supported at their outer ends in brackets $C^5$, secured within the conduit. The band-wheels $C^4$ are now connected with the companion motors D' by means of bands $C^6$. By this construction, when the motors D cease to operate and the motors D' are switched into circuit, motion will be imparted from the motors D' through band $C^6$ to band-wheel $C^4$, and the drum C being on the same shaft with wheel $C^4$ motion will be imparted to the band-wheel $C^3$, and finally the armature of the motor D will be rotated through the medium of the band $C^2$.

The supply of electricity for actuating the electric motor when such a motor is employed is furnished by some conveniently-located generator (not shown) through the medium of the conductors F. The main conductor is preferably located between the two tracks and about in the plane of the bottom of the cable-conduits; but its location may be changed to suit the conditions in any particular case.

Branch wires $G^2$ $G^3$ and $g$ $g'$ lead from the main conductor to the motors D and D', respectively, switches H being interposed at convenient points and constructed to form an electric connection between the main conductor and either one of the motors D and D', as may be found desirable. The branch wires G G' are cut at points $h$ $h'$—for example, preferably at short distances from the main conductor—and an electrical connection between the adjacent ends of the cut branches is established by means of suitable conductors $f f'$, adapted to be moved into and out of contact with the said ends.

The means which I at present employ for moving the conductors $f f'$, and thereby completing or breaking the electrical connection between the main conductor and the motor, and which I find to be expedient, consist in an electro-magnet I, provided with an armature $i$, a rod K, attached to the armature, and a pair of diverging rods $k$, connecting the rod K with slides $k'$, to which the movable conductors $f f'$ are attached. The mounting of the movable conductors $f f'$ and the connections between their supports and the rod attached to the armature $i$ are plainly shown in Fig. 4 of the accompanying drawings. The conductors $f f'$ should be properly insulated.

From the above construction it will appear that when the armature $i$ is drawn into contact with the poles of the magnet the conductors $f f'$ will be slid outwardly into contact with the adjacent ends of the branch wires, and the electrical connection between the main conductor and the motor will be complete, and that when the said armature is allowed to move away from the armature of the magnet the conductors $f f'$ will be withdrawn from contact with the branch wires, and the electrical connection between the main conductor and the motor will be broken.

The electro-magnet I is energized as follows: A battery L, consisting of a suitable number of cells, is located in a convenient position within the vault and has a wire $l$ leading from one of its poles, coiled around the magnet, and thence extended to one of two electrical conductors M, preferably copper strips, and has its opposite pole connected with the other electrical conductor M. The conductors M extend along the upper portion of the conduit on opposite sides of the path in which the grip travels, and are normally insulated from each other and from their supports and surrounding objects. At the opposite end of the cable-section from that where the conductors M are connected with electro-magnet and with the battery the said conductors end abruptly. Thus, so long as there is no electrical connection made beween the conductors M, the battery L remains inactive, the electro-magnet I is de-energized, the armature $i$ is out of contact with the poles of the magnet, the movable conductors $f f'$ are out of contact with the branch wires, and the electric current is cut off from the motor. To limit the maximum distance of the armature from the magnets, arms $k^2$ project at right angles from the arms $k$, terminating in proximity to the rod K, against which they impinge when the armature $i$ has assumed its limit of predetermined downward movement; but the moment an electrical connection is made between the conductors M the circuit through the battery L and electro-magnet I is complete and the said magnet will be energized, the armature $i$ will be drawn into contact with its poles, the movable conductors $f f'$ will be thrown into contact with the branch wires, and the motors thereby set in motion by the current from the main conductor.

The above-referred-to connection between the conductors M, which effects a starting of the motor, is accomplished in connection with the operation of the grip as follows: The grip is supported by a standard N, attached to the floor of the grip-car. (See Fig. 10.) The main plate $n$ is a vertical steel plate, which extends downwardly from the hand-wheel $n'$ through the slot in the conduit to the clutch. It is inserted in vertical V-shaped grooves $n^3$, formed in plate $n^2$, fixed to the standard N, in which grooves its edges fit with an easy sliding movement. The plates $n^2$ are connected on top by strips $n^4$—one on each side— also by strips $n^5$, fixed to the standard N, also by strips $n^6$ below the floor of the grip-car, and also by strips $n^7$ inside the conduit. The main plate $n$ is provided with a slot $n^8$, extending from its top to near its bottom, and within said slot $n^8$ a steel bar $n^9$ is located and allowed to slide vertically in grooves formed in the plate along the edges of the slot. At the top the ends of the branches of the main plate are bound together by a collar or yoke O, preferably of circular form. The said branches are further united at a point a short distance below the yoke O by short bars $o$, one of which carries a small friction-wheel $o'$. A piece $o^2$, preferably of steel, is attached to the main plate $n$ within the cable-conduit, the said piece being provided with depending cheeks $o^3$, which serve to guide the cable to be clutched toward the central line. The piece $o^2$ is perforated to allow a bolt P to pass through it and to serve as a guide for the bolt. To the upper end of the sliding bar $n^9$ a screw $o^4$, which does not turn, is secured. The screw $o^4$ extends freely through the yoke O. The hand-wheel $n'$ has a female thread cut in its hub, into which the screw $o^4$ fits. Inside the conduit is located the sliding bar $q$, which is insulated by a sleeve of ebonite $q'$ against electrical connection with the bar $n^9$. To further protect it against electrical connection with its support, which might happen by the adherence thereto of water or mud, the ebonite cover $q^2$ is provided. The cross-bar $q$ is bent upwardly at each end and carries on each end a metallic brush $q^3$. The sliding bar $n^9$ is further provided below the cross-bar $q$ with an arm $q^4$, into which the upper end of the bolt P is screwed. To the lower end of the bolt P the upper ends of two pairs of diverging links R are pivoted on a pin $p$. The lower ends of the two pairs of links R are loosely connected with the upper ends of a pair of links R' by suitable pins $p'$. The links R' cross each other, and at the point of crossing are pivoted together and to the depending cheeks of the piece $o^2$ by a bolt or pin $p^2$.

The operation is as follows: The independent upward movement of the bar $n^9$ and the consequent upward movement of the bolt P will cause the lower ends or the clutching ends of the links R' to approach each other, and the independent downward movement of the same will cause the said ends to separate from each other. Thus, supposing the grip to be down in position for the clutch to engage the cable, the connection is made by turning the hand-wheel $n'$ to the right, and thereby sliding the bar $n^9$ upwardly in its bearings, and the cable is released by turning the said hand-wheel to the left. In order to raise the clutch-cable above the pulleys and at the same time to bring the brushes $q^3$ into electrical contact with the conductors M, the main plate $n$ and mechanism connected therewith must be raised. This is accomplished by means of a cam-wheel S, the axle of which is secured by means of a crank-pin $s$ to one of the plates $n^5$, and its face is in engagement with the face of the friction-wheel $o'$. Thus, as the cam is rotated, the friction-wheel $o'$, and with it the main plate $n$ and clutch mechanism, is raised. As hereinbefore recited, the moment the electrical connection is completed between the conductors M, which is accomplished by the brushes $q^3$ and the metal bar to which they are attached, the motor will be started, and hence the cable and the car. When the engineer desires to stop, he turns the hand-wheel to the left, thereby releasing the clutch from the cable, and at the same time, by manipulation of the cam S, the brushes will be moved out of contact with the conductors M, the magnet I will become de-energized, and the motor will stop, while the train is brought gradually to a standstill by suitable brakes. When it is desired to start again, the grip is lowered as a whole by the reverse movement of the cam S. This allows the clutch to descend onto the cable whether it be over a pulley or between pulleys. The cable is guided into the central line by the cheeks $o^3$, and is there clutched by turning the hand-wheel, and the cable raised from the pulleys and brushes brought into contact with the conductors by turning the hand-wheel and rotating the cam, as before explained.

The prominent advantages of a road constructed and operated as above described consist in the means which it affords for regulating the amount of motive power in proportion to the work to be done, the employment of lighter cables, and hence a reduction in dead-weight to be carried. Strain upon the cable is avoided because it is clutched while still. Motors of the proper power to drive the train along any section upgrade or on a level may be employed, thus suiting the power exactly to the work to be done, and there is required but little skill to manage the train because of the automatic electrical connections made simultaneously with the manipulation of the grip.

It is evident that numerous changes in the form and arrangement of the several parts might be resorted to without departing from the spirit and scope of my invention; hence I do not wish to limit myself strictly to the construction herein set forth; but, Having fully described my invention, what I claim as new, and desire to secure by Letters Patent, is—

1. The combination, with a power-transmitting cable, of a motor for driving the same, a permanently-charged electric conductor to supply power to the motor, and an independent electric circuit to control the admission of power to the motor.

2. The combination, with a track and a car carrying a grip, of a power-transmitting cable, a motor for actuating the same, means for admitting power to and cutting it off from the motor, a local electric circuit, and means for opening and closing the same to control the admission of power to the motor, substantially as set forth.

3. The combination, with a track and a car carrying a grip, of a power-transmitting cable, a motor for actuating the same, a local electrical circuit, means for opening and closing the same, an electro-magnet in said circuit, and a device for admitting power to and shutting it off from the motor, said device being connected with the armature of the magnet, substantially as set forth.

4. The combination, with a track and a car carrying a grip, of a power-transmitting cable, a motor, a permanently-charged conductor to supply power to the motor, a pair of insulated conductors located along the track, a local battery having its poles connected with the last-named conductor, a connector carried by the car for electrically uniting said insulated conductors, and devices located in said local circuit for controlling the admission of power to the motor, substantially as set forth.

5. In combination, a car carrying a grip, a track, a power-transmitting cable, a motor, a permanently-charged electric conductor to supply power to the motor, a pair of insulated conductors located along the opposite sides of the path in which the grip travels and having a connection with the poles of a local battery, an electro-magnet in circuit with said local battery to control the admission of power to the motor, and a circuit maker and breaker adapted to be operated by the grip mechanism, substantially as set forth.

6. In combination, a power-transmitting cable, a motor, a permanently-charged electric conductor to supply power to the motor, normally-open connections between the conductor and the poles of the motor, a local circuit, an electro-magnet in the local circuit, and devices for closing the normally-open connections between the main conductor and the motor, said devices being connected with the armature of the electro-magnet, so that when the magnet is energized the said connections will be closed and when the magnet is de-energized the connections will be open, substantially as set forth.

7. In combination, a power-transmitting cable, a motor to drive the cable, a companion motor to drive the cable, a permanently-charged electric conductor to furnish power to the motors, branch connections between the conductor and the motors, switches interposed in the branch connections to throw either motor into electric connection with the conductor at pleasure, and an independent electric circuit to control the admission of power to the motors, substantially as set forth.

8. In combination, a power-transmitting cable, a motor to drive the cable, a main electric conductor permanently charged to supply power to the motor, normally-open connections between the main conductor and the motor, a local electric circuit, an electro-magnet in the local circuit, a pair of short conductors constructed to slide into and out of contact with the ends of the branch connections to make or break the connection between the main conductor and the motor, and mechanism connecting the said sliding conductors with the armature of the magnet, for the purpose substantially as set forth.

9. In combination, a power-transmitting cable, a motor to drive the cable, a power-supply, a grip adapted to engage the cable, a local electric circuit extending for a greater or less distance along the path in which the grip travels, and an electric conductor attached to the grip and adapted to make and break the said local circuit as the grip is manipulated, substantially as set forth.

10. The combination, with several endless power-transmitting cables arranged one after another along a railway-track, independent motors to drive the cables, and a power-supply common to the several motors, of independent electric circuits—one for each cable-section—adapted to control the admission of power to the motors, substantially as set forth.

11. The combination, with several endless power-transmitting cables arranged one after another along a railway-track, independent motors to drive the cables, and a permanently-charged electric conductor extending along the track to supply power to the several motors, of independent electric circuits—one for each cable-section—adapted to control the admission of power to the motors, substantially as set forth.

12. The combination, with the local electric circuit and its conductors located along the path of the grip, of the grip carrying the circuit-closing bar and the clutch mechanism, means for adjusting the clutch and the circuit-closing bar up and down independent of each other, and means for adjusting the grip as a whole, substantially as set forth.

13. The combination, with the main plate of the grip secured to a suitable support on the car, provided with a vertical slot, of a vertically-sliding plate located in said slot and carrying a circuit-closer, a bar seated in vertically-sliding adjustment in a recess or slot formed in the said sliding plate, the said bar having clutch-operating mechanism attached thereto, means for operating the said bar independently of the sliding plate, and means for operating the plate and bar as a whole, substantially as set forth.

14. In a cable railway, the combination, with a power-transmitting cable, a motor to actuate the same, and insulated conductors located along the line of railroad, of the main plate of a grip and its support, a vertically-sliding plate seated in a slot formed in the sliding plate, a cable-guide depending from the sliding plate, a clutch attached to the depending guide, and means for operating the bar and sliding the plate, substantially as set forth.

15. The combination, with a power-transmitting cable and a motor of the main plate of the grip and its support, of a vertically-sliding plate seated in the main plate, a vertically-sliding bar seated in the sliding plate, a circuit-closer carried thereby, a cable-guide depending from the sliding plate, a clutch consisting, essentially, of a pair of levers pivoted to the depending cable-guide, a rod or bolt connected with the upper ends of the clutch-levers by links and connected with the said vertically-sliding bar to operate the clutch, and means for operating the bar and the sliding plate, substantially as set forth.

16. The combination, with the grip consisting, essentially, of a vertically-sliding plate carrying a clutch and a vertically-sliding bar, the said vertically-sliding plate being provided with a circuit-closing bar having metallic brushes at its ends, of a pair of copper strips located along the opposite sides of the path of the grip, the said strips being insulated from the surrounding surfaces and connected with the poles of a local battery, means for actuating the sliding bar to close the clutch, and means for actuating the sliding plate to elevate the clutch and bring the said metallic brushes into contact with the copper strips, whereby the local circuit is closed when the clutch is in position to travel, for the purpose substantially as set forth.

17. In a cable railway, the combination, with the grip and an electric circuit to control the movements of the cable, of circuit-closing bar attached to the grip and provided with brushes to form points of contact to close the circuit and means for throwing the said circuit into and out of contact, substantially as set forth.

In testimony whereof I have signed this specification in the presence of two subscribing witnesses.

HENRY FLAD.

Witnesses:
 EMORY S. FOSTER,
 C. H. DANA.